United States Patent [19]

Asahi et al.

[11] Patent Number: 4,644,137

[45] Date of Patent: Feb. 17, 1987

[54] CIRCUIT FOR CONTROLLING A RICE COOKER WITH POWER INTERRUPTION CONTROL

[75] Inventors: Morio Asahi, Gifu; Terutaka Aoshima, Toyohashi; Ryuuho Narita; Masahiro Imai, both of Nagoya, all of Japan

[73] Assignee: Kabushiki Kaisha Toshiba, Kawasaki, Japan

[21] Appl. No.: 781,635

[22] Filed: Sep. 30, 1985

[30] Foreign Application Priority Data

Oct. 5, 1984 [JP] Japan .................................. 59-210135

[51] Int. Cl.$^4$ .............................................. H05B 1/02
[52] U.S. Cl. .................................. 219/497; 219/501; 219/506; 361/59; 307/96; 364/187
[58] Field of Search ............... 219/501, 494, 497, 490, 219/491, 489, 507–510, 506; 307/96, 87; 361/59; 364/187

[56] References Cited

U.S. PATENT DOCUMENTS

| | | | |
|---|---|---|---|
| 3,623,077 | 11/1971 | Clark | 364/187 |
| 4,025,762 | 5/1977 | Rossi et al. | 364/187 |
| 4,351,023 | 9/1982 | Richer | 364/187 |
| 4,356,526 | 10/1982 | Russell | 361/59 |

Primary Examiner—M. H. Paschall
Attorney, Agent, or Firm—Cushman, Darby & Cushman

[57] ABSTRACT

A circuit for controlling a rice cooker having at least one heater used for cooking rice comprises, a rice cooking mode setting section capable of selectively setting three or more different rice cooking modes having high, medium and low heater heating calories, respectively, a main control section for fetching preset mode data set by the rice cooking mode setting section, and for supplying a predetermined energize/deenergize control signal corresponding to the preset mode data to the heater, a power interrupt detecting section for detecting a state wherein supply of a drive power voltage to the main control section is temporarily interrupted after the preset mode data is fetched in the main control section, and for maintaining the detected state for a predetermined period of time, and a power interrupt recovering operation control section for fetching a detection signal from the power interrupt detecting section when supply of the drive voltage to the main control section is recovered, and for controlling the main control section in such a manner that the energize/deenergize control signal corresponding to a specific rice cooking mode at the medium heating calorie is supplied to the heater.

7 Claims, 9 Drawing Figures

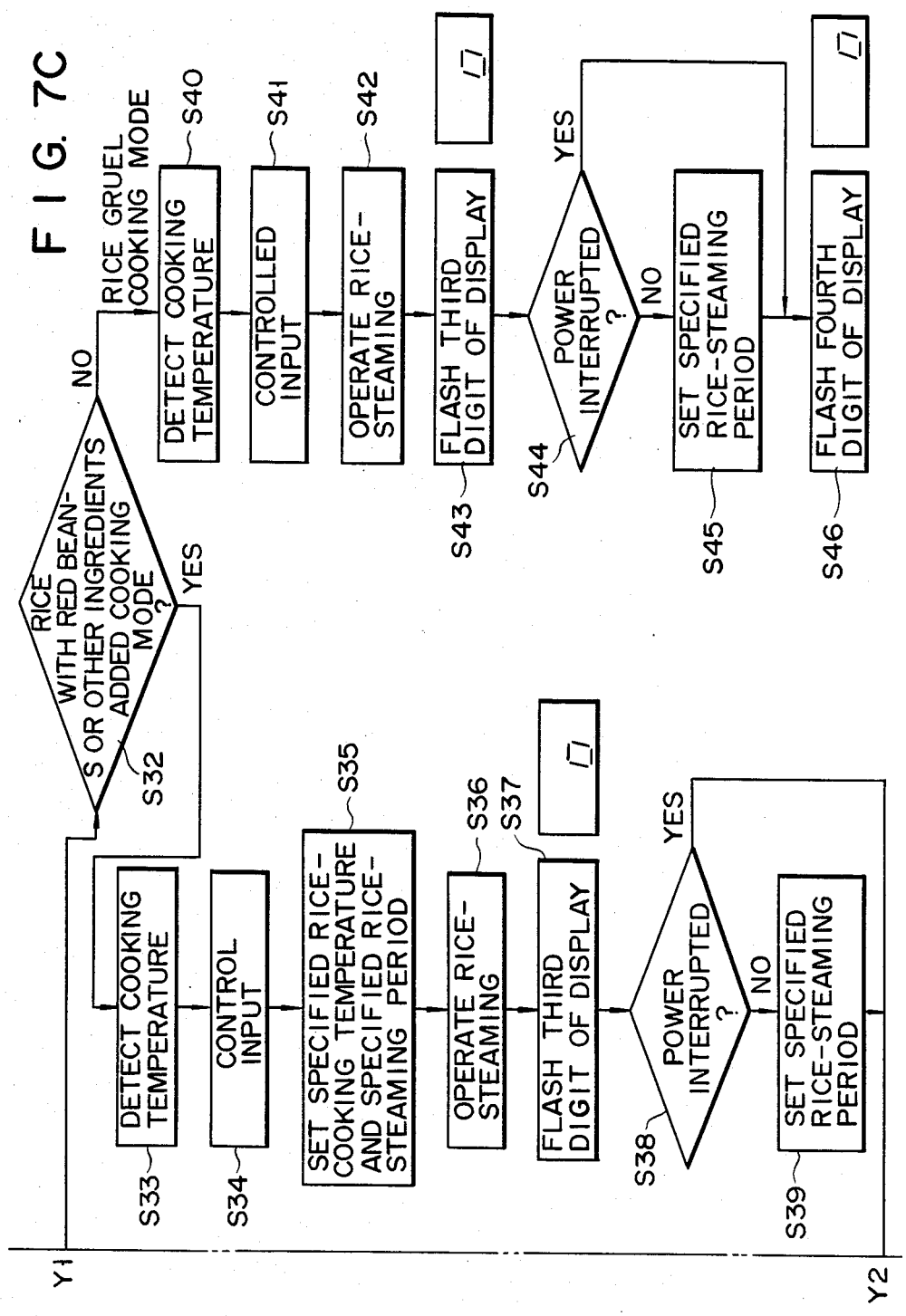

CIRCUIT FOR CONTROLLING A RICE COOKER WITH POWER INTERRUPTION CONTROL

BACKGROUND OF THE INVENTION

This invention relates to a circuit for controlling a rice cooker, and, more particularly, to a power interrupt countermeasure in a circuit for controlling a rice cooking operation by a processor such as a microcomputer.

A rice cooker which controls a rice cooking operation using a microcomputer has recently been developed. In general, the control circuit of such a rice cooker has three or more rice cooking modes, each using a different heating calorie, amount and e.g., high, medium and low heating calories for a rice cooking heater; and a desired rice cooking mode can be executed in accordance with user selection. More specifically, in addition to the HAKUMAI DAKI (polished rice cooking) mode which is most frequently used, there are provided a GENMAI DAKI (unpolished rice cooking) mode, a TAKIKOMI OKOWA DAKI (rice with other ingredients added or rice with red beans cooking) mode, and an OKAYU DAKI (rice gruel cooking) mode. Of these modes, the rice cooking heater is energized at the highest heating calorie in the polished rice cooking mode until rice cooking is completed. In the unpolished rice cooking, rice with other ingredients or rice with red beans cooking modes, the heater is energized at a medium heating calorie for a relatively long period of time. In the rice gruel cooking mode, the heater is energized at a low heating calorie for a relatively long period of time.

In the control circuit of the rice cooker, data indicative of the rice cooking mode selected by a user before operation is fetched by a processor, and the rice cooking operation is controlled in accordance with the fetched data.

In this case, if power interrupt occurs after setting the rice cooking mode, the preset rice cooking mode data may be lost due to a power interruption when the rice cooking operation is restarted.

For this reason, in the control circuit of a conventional rice cooker, when the cooker resumes operation after a power interrupt, the polished rice cooking mode, which is most frequently used, is automatically set and the rice cooking operation automatically restarted.

In the control circuit of the conventional rice cooker, as long as the polished rice cooking mode is preset in the case of power interrupt, no problem occurs. However, if another rice cooking mode is preset, various problems occur. That is, when the rice gruel cooking mode is preset, the rice gruel is abruptly cooked at too high a heating calorie and an overcooked state occurs. Similarly, when the unpolished rice cooking mode is preset, undercooking results since the unpolished rice is undesirably cooked for too short a time at a high heating calorie ordinarily suited to cooking polished rice within a short period of time. Therefore, it is difficult to perform appropriate cooking of rice other than polished rice.

SUMMARY OF THE INVENTION

It is, therefore, an object of the present invention to provide a new and improved circuit for controlling a rice cooker which can resume operation so that, in the case of power interrupt, a cooking state substantially similar to the original cooking state can be obtained regardless of the nature of the preset rice cooking mode.

According to the present invention, there is provided a circuit for controlling a rice cooker having at least one heater used for cooking rice, comprising:

rice cooking mode setting means capable of selectively setting three or more different rice cooking modes having high, medium and low heater heating calories, respectively;

main control means for fetching preset mode data set by said rice cooking mode setting means, and for supplying a predetermined energize/deenergize control signal, corresponding to the preset mode data, to said heater;

power interrupt detecting means for detecting a state wherein supply of a drive power voltage to said main control means is temporarily interrupted after the preset mode data is fetched in said main control means, and for maintaining the detected state for a predetermined period of time; and power interrupt resuming operation control means for fetching a detection signal from said power failure detecting means when supply of the drive voltage to said main control means is recovered, and for controlling said main control means in such a manner that an energize/deenergize control signal corresponding to a specific rice cooking mode of a medium heating calorie is supplied to said heater.

With the above arrangement of the present invention, a rice cooking operation is performed for a specific mode at the medium heating calorie of a rice cooking heater when the cooker resumes operation after a power interrupt. Thus, even if a rice cooking mode for a high or low heating calorie has been preset, a low or excessive heating calorie state can be prevented since the rice cooking operation is executed at the middle heating calorie.

BRIEF DESCRIPTION OF THE DRAWINGS

These and other objects and features of the present invention can be understood by reference to the accompanying drawings, in which:

FIGS. 7A to 7C are flow charts explaining the operation of this embodiment.

DETAILED DESCRIPTION OF THE PREFERRED EMBODIMENT

An embodiment of the present invention will be described with reference to the accompanying drawings.

Figure 1:
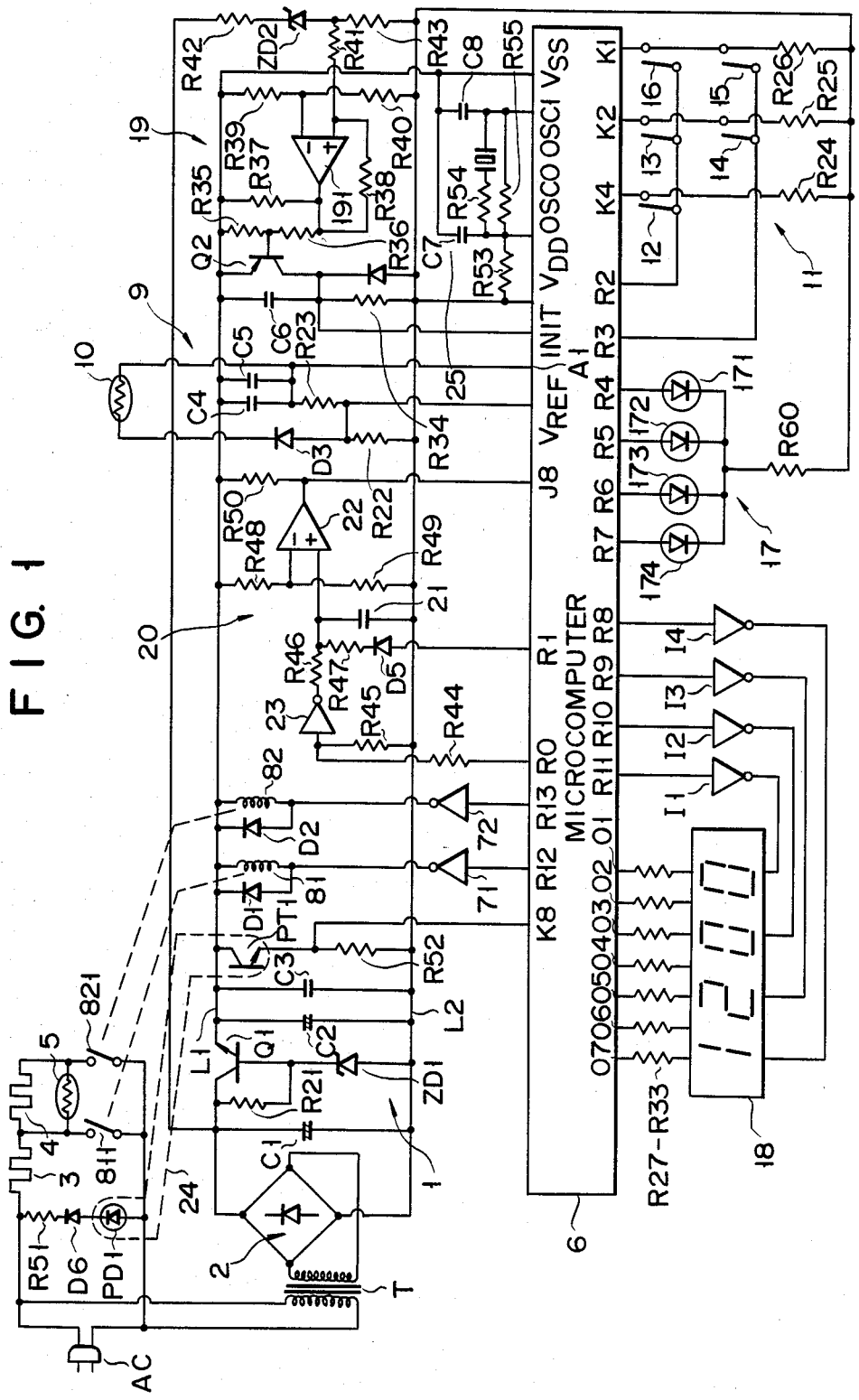
FIG. 1 is a circuit diagram showing a control circuit of a rice cooker according to an embodiment of the present invention.

Referring to FIG. 1, an AC voltage from an AC power source (not shown) applied to a power source plug AC is supplied to a full-wave rectifier 2 through a transformer T. A DC voltage generated from the rectifier 2 is supplied to a constant voltage power source circuit 1 through a smoothing capacitor C1. The circuit 1 is constituted by a control transistor Q1, a constant voltage diode ZD1, a bias resistor R21 and parallel-connected capacitors C2 and C3, and is connected between lines L1 and L2 so as to generate a predetermined DC constant voltage.

The plug AC is connected to a rice cooking heater 3, a warm heater 4 and a cover heater 5 through movable contacts 811 and 821 of relays 81 and 82. One end of each relay 81 or 82 is connected to the line L1, and the other end thereof receives energize/deenergize signals supplied from output terminals R12 and R13, respectively, of a processor, e.g., a microcomputer 6 such as a TMS 2600 available from Texas Instruments, Co., Ltd. (for controlling cooking operations as described later), through inverters 71 and 72. Note that protective diodes D1 and D2 are connected to the two ends of the relays 81 and 82, respectively.

Referring to FIG. 1, reference numeral 9 denotes a temperature sensor for detecting the temperature of a rice cooking pot (not shown) by a thermistor 10 so as to supply various temperature data (to be described later) to an input terminal A1 of the microcomputer 6. In this case, the sensor 9 has resistors R22 and R23, capacitors C4 and C5 and a diode D3 connected between the lines L1 and L2 and a reference voltage terminal $V_{REF}$ of the microcomputer 6.

Furthermore, referring to FIG. 1, reference numeral 11 denotes an input switch group provided on the operation panel (see FIG. 2) of a rice cooker main body (not shown), comprising a cooking mode selection switch 12, a rice cooking switch 13, a timer rice cooking switch 14, a start switch 15 and a cancel switch 16. These switches 12 to 15 are connected in a key matrix through resistors R24, R25 and R26 with respect to terminals K4, K2, K1, R2 and R3 of the microcomputer 6. In this case, in an initial state immediately after turning on a power switch (not shown), the rice cooker is set in the polished rice cooking mode under the control of the microcomputer 6. Thereafter, when the user depresses the switch 12, the unpolished rice cooking mode, the rice with other ingredients added or rice with red beans cooking mode or the rice gruel cooking mode can be sequentially set in accordance with the switches depression time period and number.

The respective rice cooking modes are executed under the control of the microcomputer 6 so that energize/deenergize time, power in an energized state and the like of the heaters 3 to 5 are controlled to obtain optimum rice cooking temperatures suited to the respective modes.

Figure 3:
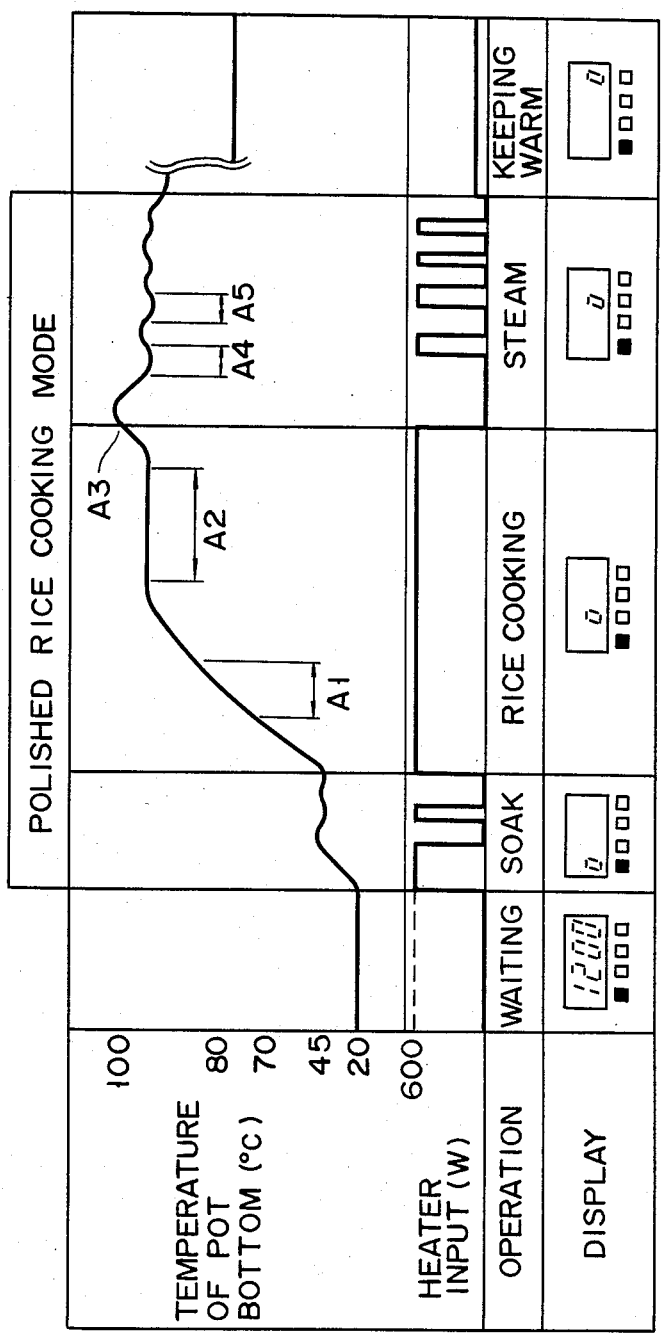
FIGS. 3 to 6 are representations showing control states of respective modes so as to explain an operaton of this embodiment.
Figure 4:
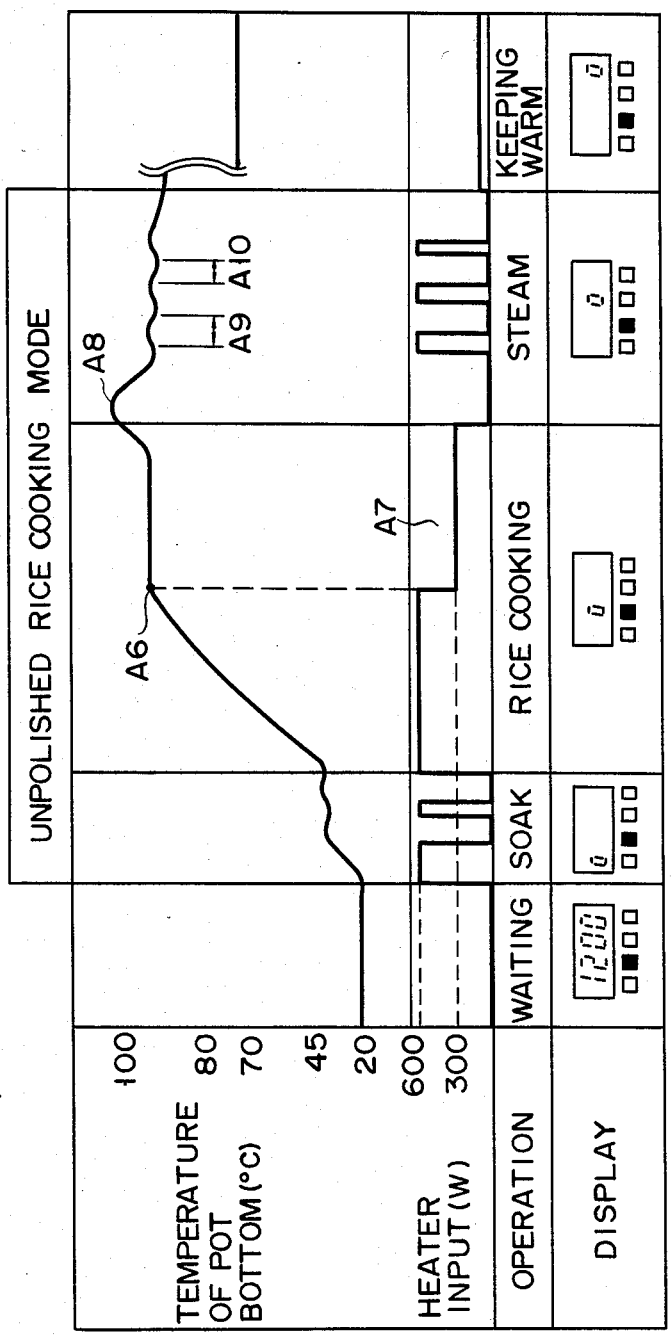
Figure 5:
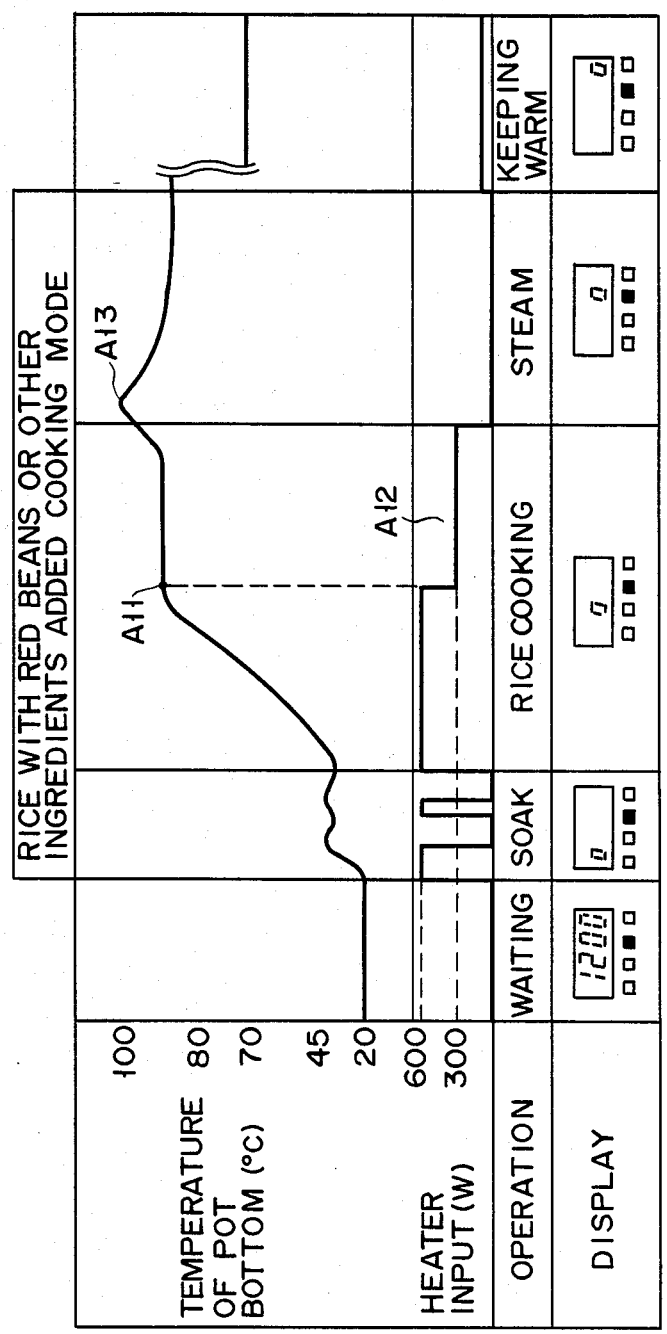

Control states of the rice cooking operation in the respective modes will be described hereinafter. In the polished rice cooking mode, the heater 3 is energized at a high heating calorie. More specifically, as shown in FIG. 3, the following operations are sequentially executed: a soak operation in which the heater 3 is intermittently energized for a short period of time, a rice cooking operation in which the heater 3 is energized by 600 W heating calorie, and, subsequently, deenergized when water in a pot is both absorbed by rice and partially evaporated, i.e., when a so-called dry-up state is detected by the temperature sensor 9; and a steam operation in which the heater 3 is intermittently energized. The unpolished rice cooking mode corresponds to a specific mode in which the heater 3 is energized at the medium heating calorie. More specifically, as shown in FIG. 4, the following operations are sequentially executed: the same soak operation as described above, a rice cooking operation in which the heater 3 is first energized by 600 W heating calorie, and then, after 4 minutes elapses from the time the sensor 9 detects that the temperature of the pot has reached 90° C., is energized by 300 W heating calorie until the dry-up state is reached; and the same steam operation as described above. Note that heating calorie of the heater 3 can be controlled by changing the duty ratio of the power supplied to the heater 3.

Figure 6:
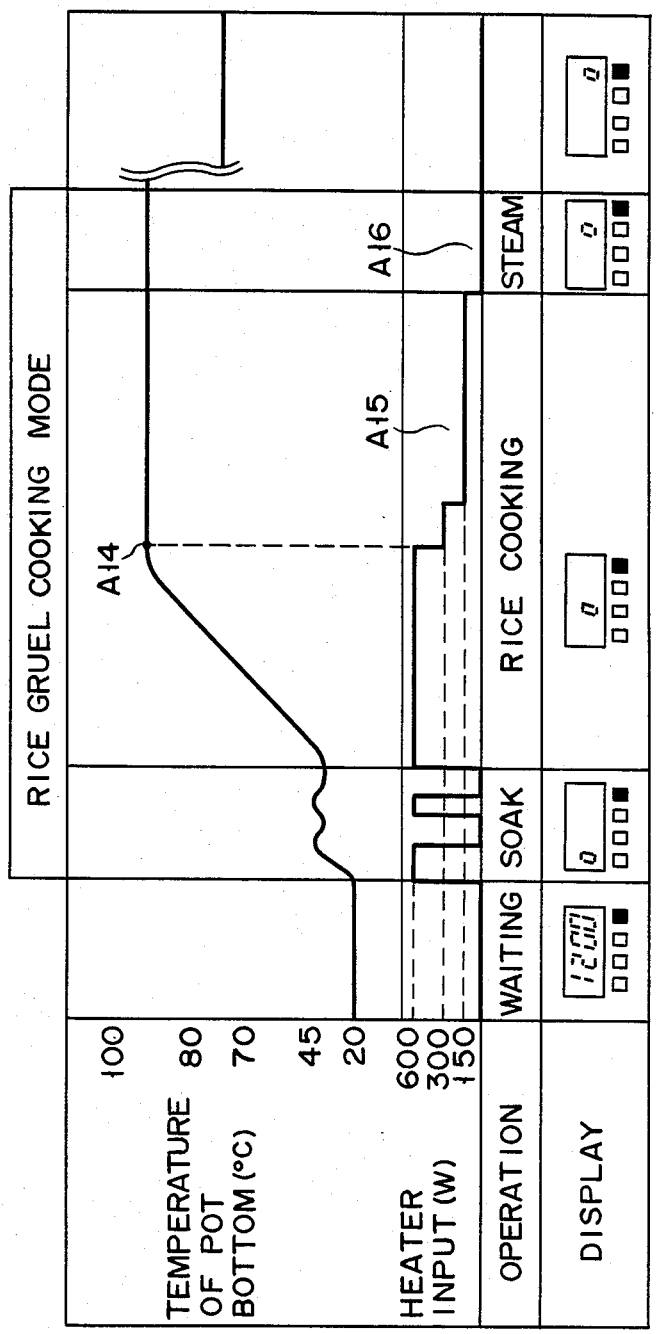

In the rice with other ingredients or rice with red beans cooking mode, the same soak and rice cooking operations as in the unpolished rice cooking mode are sequentially executed, a steam operation in which the heater 3 is deenergized for a predetermined period of time being executed thereafter. In contrast, in the rice gruel cooking mode, the heater 3 is energized at a low heating calorie. More specifically, as shown in FIG. 6, the following operations are sequentially executed: the same soak operation as described above, a rice cooking operation in which the heater 3 is first energized by 600 W heating calorie, and, after 4 minutes elapses from the time the sensor 9 detects that the temperature of the pot has reached 90° C., is energized by 300 W heating calorie for 6 minutes, and is then, finally, energized by 150 W heating calorie for a predetermined period of time; and a steam operation in which the heater 3 is deenergized for 5 minutes. In the polished rice cooking mode, the unpolished rice cooking mode, and the rice with other ingredients or rice with red beans cooking mode, a keeping warm operation in which the heaters 3, 4 and 5 are energized by very low heating calorie, e.g., 50 W when the temperature is to be kept at 70° C., is executed after the steam operation.

The keeping warm operation is not executed in the rice gruel cooking mode since much water still remains after the rice gruel has been cooked. Consequently, if the rice gruel is kept warm for a long period of time it is turned into an inedible paste.

Figure 2:
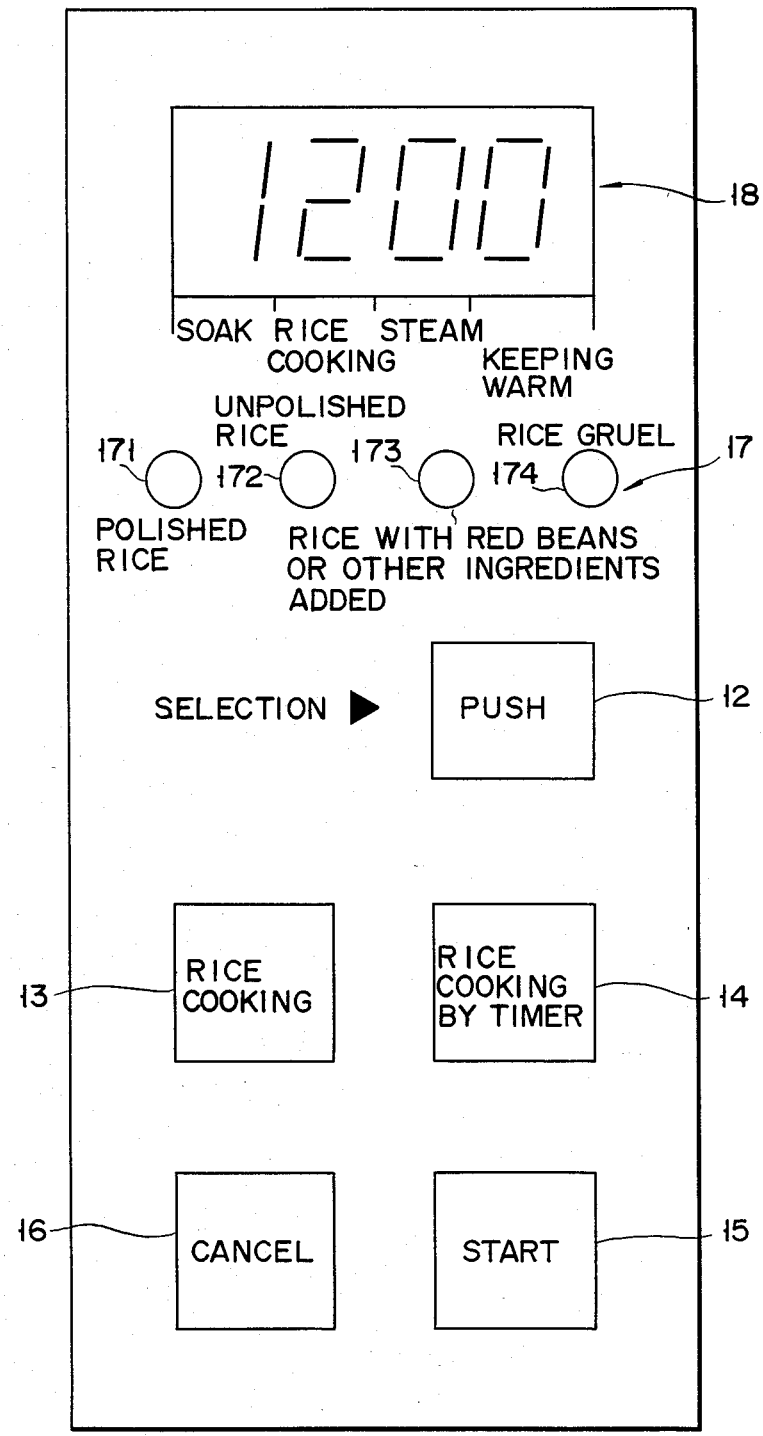
FIG. 2 is a front view showing an operation panel of this embodiment.

In correspondence with these modes, a polished rice cooking mode indication lamp 171, an unpolished rice cooking mode indication lamp 172, a rice with other ingredients or rice with red beans cooking mode indication lamp 173 and a rice gruel cooking mode indication lamp 174 of a mode indication portion 17 provided on the operation panel unit shown in FIG. 2 are sequentially flashed. These indication lamps 171 to 174 are connected in common to terminals R4 to R7 of the microcomputer 6 through a resistor R60.

When the rice cooking switch 13 is turned on, the soak operation to be described later is omitted, and the rice cooking operation is started. Furthermore, when the cancel switch 16 is turned on before the rice cooking mode is executed, previous key inputs from the input switch group 11 are invalidated. When the switch 16 is turned on during execution of the rice cooking mode, the following operation is interrupted. When the timer rice cooking operation is required, the timer rice cooking switch 14 is operated so as to set a standby time on a time display portion 18 (to be described later) until the rice cooking operation starts. Furthermore, the start switch 15 is operated after setting a desired state by means of the above-mentioned switches, thereby starting execution of the preset operation.

The time display portion 18 comprises a 4-digit, 7-segment liquid crystal display provided on the operation panel unit shown in FIG. 2. The portion 18 is connected to terminals O1 to O7 of the microcomputer 6 through resistors R27 to R33, respectively, and is connected to terminals R8 to R11 through inverters I1 to I4, respectively. The portion 18 displays the remaining time in the timer operation mode described above, and indicates, using 4 digits (figures), that the soak, rice cooking, steam and keeping warm operations are being executed during execution of each rice cooking mode by flashing the corresponding digits. In this case, the keeping warm operation is not, as described above, performed in the rice gruel cooking mode. Nonetheless, when the steam operation ends, the fourth digit (least significant digit) indicating the execution of the keeping warm operation in the other rice cooking modes is still flashed.

Furthermore, referring to FIG. 1, an initialization circuit 19 is constituted by a comparator 191, a transistor Q2, resistors R34 to R43, a capacitor C6, a diode D4 and a constant voltage diode ZD2 connected between the lines L1 and L2, and supplies to an initialization terminal INIT an initialization signal for driving the microcomputer 6 at a predetermined threshold voltage.

Reference numeral 20 denotes a power interrupt compensation circuit constituted by a capacitor 21, a comparator 22, an inverter 23, resistors R44 to R50 and a diode D5 connected between the lines L1 and L2. When the standby operation, the steam operation or the rice cooking operation is initiated, the circuit 20 sets an output terminal R1 of the microcomputer 6 at a high level so as to charge the capacitor 21. When the steam operation is completed, the circuit 20 sets an output terminal R0 of the microcomputer 6 at a low level so as to discharge the capacitor 21 through the inverter 23. Thus, if power interrupt occurs during the standby operation or the rice cooking operation, since the capacitor 21 can be kept charged, the output of the comparator 22 and an input terminal J8 of the microcomputer computer 6 attain a high level after recovering from power interrupt. Therefore, the microcomputer 6 can determine that the standby operation or the rice cooking operation was being executed before the power interrupt. When power interrupt occurs during the standby operation or the rice cooking operation, since the input terminal J8 is at a high level when the signal is supplied to the initialization terminal INIT of the microcomputer 6 after recovering from power interrupt, the unpolished rice cooking mode is executed irrespective of the preset rice cooking mode, as shown in discrimination steps A and B in the flow charts of FIGS. 7A to 7C which will be described later in more detail.

Particularly in this embodiment, when the unpolished rice cooking mode is to be executed after recovering from power interrupt, as described above, all the indication lamps 171 to 174 of the portion 17 are turned off, thereby signalling that power interrupt has occurred. In this case, since lateral lines are additionally displayed on all the digits of the portion 18, it can be easily confirmed that the unpolished rice cooking mode is being executed after recovering from power interrupt (see YES portions of steps S4, S9 and S13 in FIG. 7A).

Note that in FIG. 1, reference numeral 24 denotes a waveshaping circuit for supplying a time count output signal to a terminal K8 of the microcomputer 6. The time count output signal is obtained by waveshaping a commercial AC power source voltage into a rectangular wave voltage by a photocoupler constituted by a photodiode PD1 connected to two ends of the plug AC through a resistor R51 and a diode D6, and a phototransistor PT1 connected between the lines L1 and L2 through a resistor R52.

Reference numeral 25 denotes an oscillator having a ceramic vibrator OSC connected between power source terminals VSS and VDD which are connected so as to correspond to the lines L1 and L2, resistors R53 to R55 and capacitors C7 and C8. The oscillator 25 applies, across terminals OSC1 and OSC0 of the microcomputer 6, a clock signal of, for example, 460 kHz as the basis of the operation for commands of the microcomputer 6.

The operation of the rice cooker with the above arrangement will be described with reference to the control states of FIGS. 3 to 6 and the flow charts of FIGS. 7A to 7C.

Figure 7A:
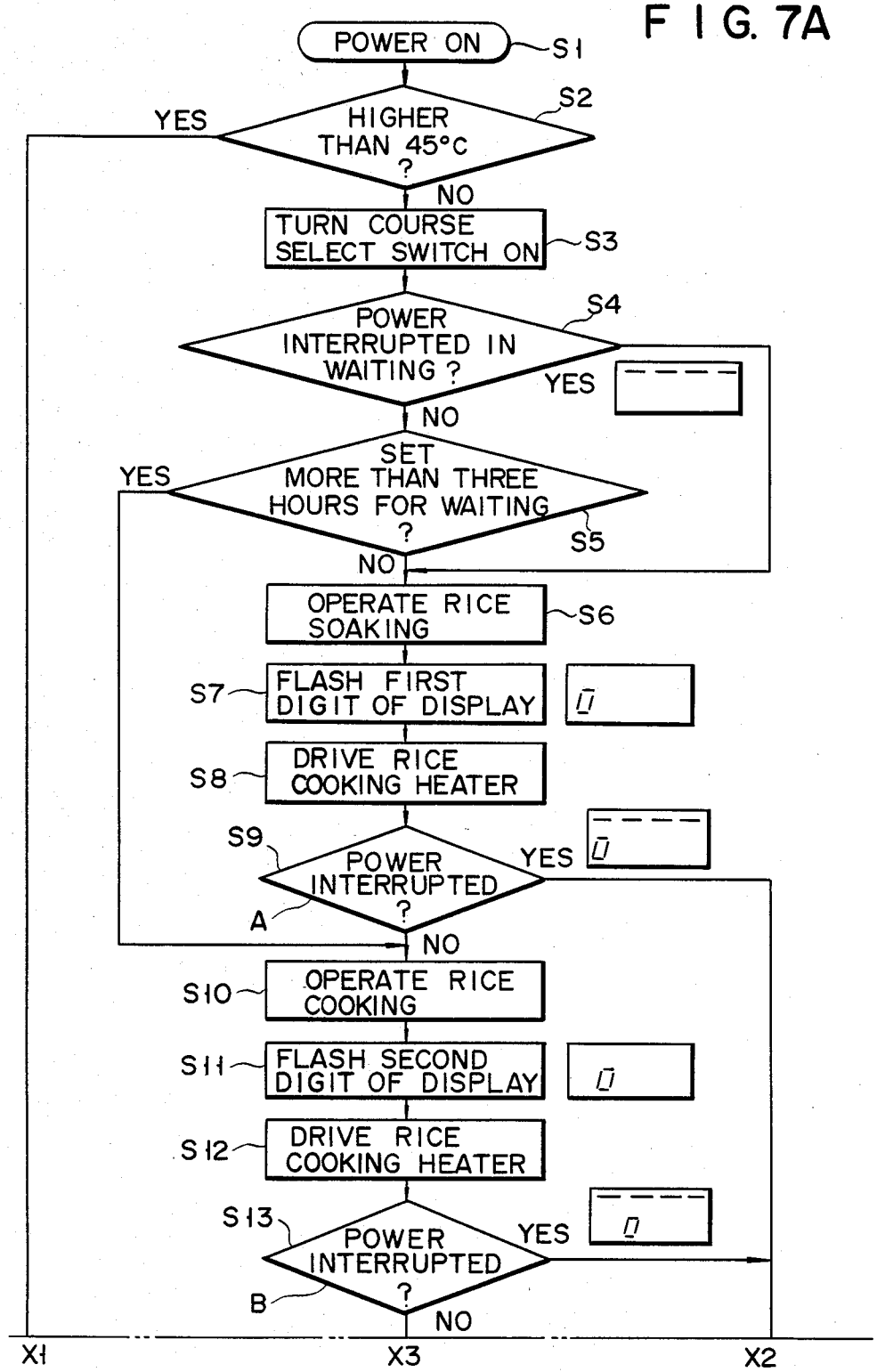
Figure 7B:
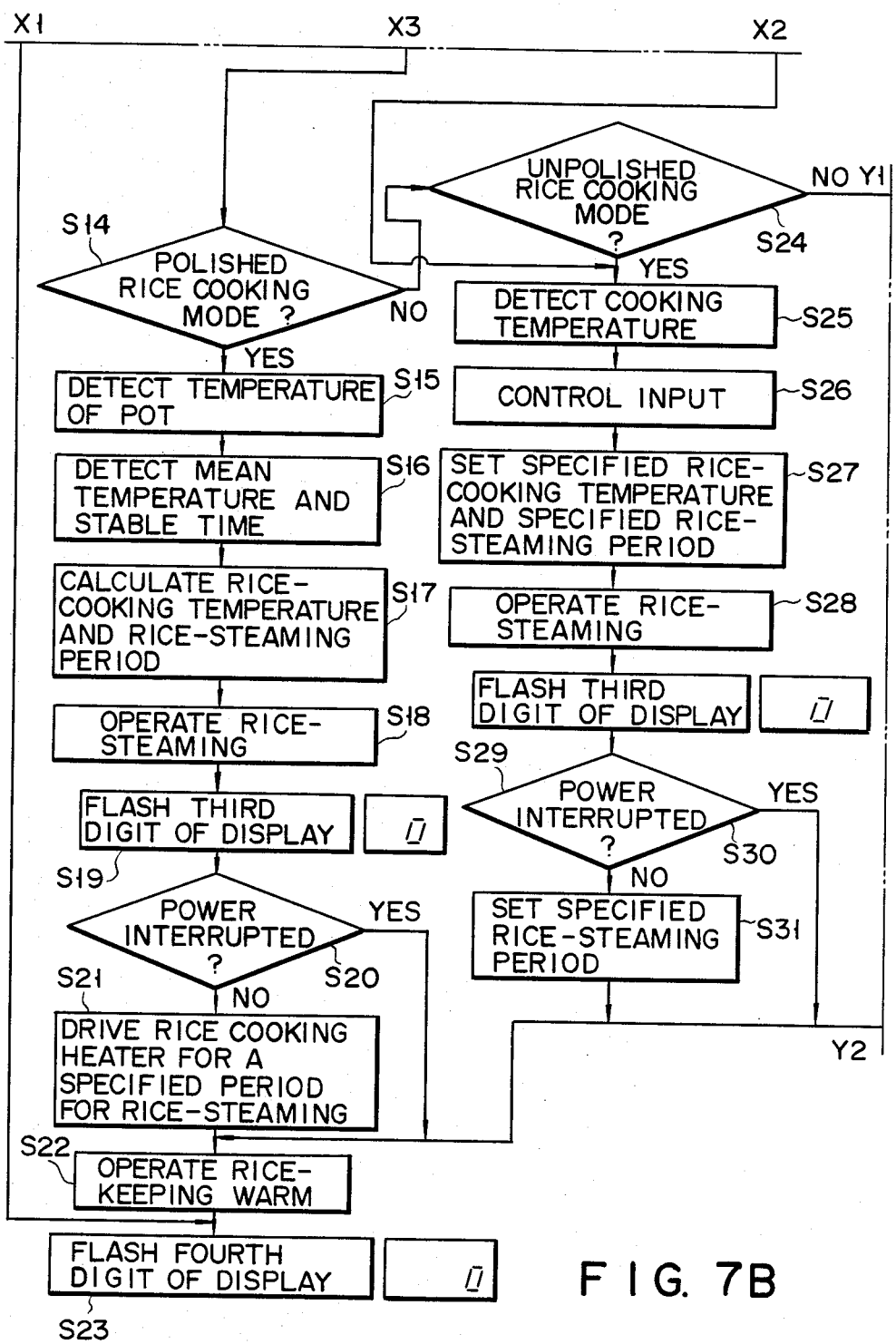

In the flow charts of FIGS. 7A to 7C, when power is ON in step S1, the flow advances to step S2, and it is checked if the temperature of the pot is higher than 45° C. This can be performed so that the sensor 9 in FIG. 1 causes the microcomputer 6 to fetch pot temperature data from the thermistor 10. This step is conducted on the assumption that the user has moved the pot in which the rice cooking operation has reached completion (including movement during the keeping warm operation), to another place. Therefore, if YES in step S2, the same processing is performed as after step S22 for the keeping warm operation (to be described later). If NO in step S2, the flow advances to step S3, the switches 12 and 15 are turned on and the microcomputer 6 receives data indicating the selected rice cooking mode; however, the polished rice cooking mode is automatically set before operating the switch 12. Then, the flow advances to step S4.

Assuming a case wherein the switch 14 is operated, it is checked at step S4 if a power interrupt has occurred during the standby operation. As has been described above, this can be performed by fetching the signal from the circuit 20 in the microcomputer 6. If a YES result is found in step S4, the flow jumps to step S6, to be described later, and the soak operation is performed. The same operation is performed when the switch 14 is not operated. If NO in step S4, the flow advances to step S5, and it is checked if 3 or more hours are set for the standby operation by means of the timer. This step is internally processed by the microcomputer 6. If YES in step S5, it is determined that the soak operation has been performed naturally during the standby operation, and the flow jumps to step S10 (to be described later) so as to perform the rice cooking operation. If NO in step S5, the flow advances to step S6 and the soak operation is performed. When instructions for the soak operation are provided, the first digit of the portion 18 is flashed in step S7. Subsequently, in step S8, the heater 3 is energized so as to perform the soak operation, i.e., set at a temperature where the rice can easily absorb the water. The flow advances to step S9, and it is checked if power interrupt has occurred during the soak operation in the same manner as in the above step.

If YES in step S9, the rice cooking operation in the unpolished rice cooking mode is executed in step S24 and thereafter after recovering from power interrupt and irrespective of the preset rice cooking mode. This corresponds to the processing A described above. However, if NO in step S9, the flow advances to step S10, and the rice cooking operation is performed. When instructions for the rice cooking operation are provided, the second digit of the portion 18 is flashed in step S11. Subsequently, in step S12, the heater is energized for the rice cooking operation. The flow advances to step S13, and it is checked if power interrupt has occurred during the rice cooking operation (before the operation is completed) in the same manner as described above. If YES in step S13, the rice cooking operation in the unpolished rice cooking mode is performed in step S24 and thereafter in the same manner as in step S9. This corresponds to the processing B described above. However, if NO in step S13, the flow advances to step S14, and it is checked if the polished rice cooking mode is set. If NO in step S14, the flow advances to step S24, and it is checked if the unpolished rice cooking mode is set. If NO in step S24, the flow jumps to step S32, and it is checked if the rice with other ingredients added or rice with red beans cooking mode is set. If NO in step S32, since it can be determined that the preset mode is the rice gruel cooking mode, processing for the rice gruel cooking mode is executed.

However, if YES in step S14, control processing required for the rice cooking operation, the steam operation and the keeping warm operation in the polished rice cooking mode in steps S15 to S23 is executed. Consequently, pot temperature detection and average pot temperature detection for detecting amounts of rice and water from a temperature increase rate, and stabilizing time detection to compensate for detected amounts of rice and water detected from a stabilizing time in steps S15 and S16, correspond to gradient detection indicated by A1 and stabilizing time detection indicated by A2 in the rice cooking operation in FIG. 3. A cooking temperature suitable for the detected amounts of rice and water is determined in step S17 during a period A3 at a boundary between the rice cooking and steam operations in FIG. 3. Determination of a steam operation energization time suitable for the detected amounts of rice and water corresponds to double rice cooking times indicated by periods A4 and A5 in the steam operation of FIG. 3. This being the case, the double rice cooking times are determined in accordance with the amount of rice to be boiled. When instructions are given for the steam operation in step S18, the third digit of the portion 18 is flashed in step S19. Subsequently, it is checked in step S20, in the same manner as described above, if power interrupt has occurred during the steam operation. If YES in step S20, the keeping warm operation is executed in step S22. However, if NO in step S20, the heater 3 is energized for the steam operation for a predetermined period of time (e.g., 15 minutes), and the keeping warm operation is then performed in step S22. When instructions for the keeping warm operation are given, the fourth digit of the portion 18 is flashed in step S23.

However, if YES in step S24, the processing required for the rice cooking operation and the steam operation of the unpolished rice cooking mode is performed in steps S25 to S31. A cooking temperature is detected in step S25 during a period A6 in FIG. 4. Control for maintaining the cooking temperature and the constant energization time corresponds to periods A8, A9 and A10 (for maintaining the double rice cooking times, e.g., 30 minutes and 20 minutes) shown in the steam operation of FIG. 4. Steps S28 to S31 and the keeping warm operation (steps S22 and S23) are substantially the same as those in control in the polished rice cooking mode.

If YES in step S32, the processing required for the rice cooking operation and the steam operation in the rice with other ingredients or rice with red beans cooking operation in steps S33 to S39 is executed. The cooking temperature in step S33 is detected during a period A11 shown in the rice cooking operation of FIG. 5. Input control in step S34 corresponds to a period A12 of FIG. 5. Control for the constant cooking temperature in step S35 corresponds to a period A13 of FIG. 5. Steps S36 to S39 and the ensuring keeping warm operation (steps S23 and S24) are substantially the same as those in control in the polished rice cooking mode. Note that the double cooking operation is not performed in the steam operation of the rice with other ingredients or rice with red beans cooking mode.

In the rice gruel cooking mode, the rice cooking operation and the steam operation in steps S40 to S46 are performed. The cooking temperature is detected in step S40 during a period A14 shown in the rice cooking operation of FIG. 6. Input control of step S41 is performed during a period A15 of FIG. 6. In step S42, the steam operation shown in FIG. 6 is performed as indicated by a period A16 shown in the steam operation of FIG. 6. When instructions for the steam operation are given, the third digit of the portion 18 is flashed in step S43, and it is checked in step S44 if power interrupt has occurred during the steam operation. If YES in step S44, the flow advances to step S46 (to be described later) immediately after recovering from power interrupt. However, if NO in step S44, the flow advances to step S45, and the steam time is controlled to be constant (e.g., 5 minutes). Then, the flow advances to step S46, and the fourth digit of the portion 18 is flashed.

According to the present invention, when power interrupt occurs during the standby operation, or when the rice cooking mode is executed and power is recovered after power interrupt, regardless of the preset cooking mode, the unpolished rice cooking mode is executed at the medium heating calorie. Therefore, when the unpolished rice cooking mode is initially set no problem occurs, and even if the rice gruel cooking mode, in which the heater 3 is energized for a long period of time, has initially been set, edible rice gruel can be cooked without overcooking, unlike in the conventional cooker in which the polished rice cooking mode for energizing with high heating calorie is executed. If the polished rice cooking mode is initially set, sufficiently palatable rice can be cooked, although it takes a long period of time because of a lower heating calorie as compared to the polished rice cooking mode. Furthermore, if the rice with other ingredients or rice with red beans cooking mode is initially set, sufficiently appetising rice can be cooked since the difference between this mode and the unpolished rice cooking mode is that the steam operation is performed by deenergizing the heater. In addition, and particularly in this embodiment, when the unpolished rice cooking mode is executed after recovering from power interrupt, since all the lamps 171 to 174 of the portion 17 are extinguished, the user can know that the unpolished rice cooking mode is being executed due to power interrupt.

As described above, according to the present invention, since the rice cooking operation is performed at the medium heating calorie of the rice cooking heater after recovering from power interrupt, regardless of the rice cooking mode initially set before power interrupt, poor rice cooking can be prevented and the rice cooked in substantially the same manner as in the original rice cooking mode.

What is claimed is:
1. A circuit for controlling a rice cooker having at least one heater used for cooking rice, comprising:
   rice cooking mode setting means for selectively setting one of at least three different rice cooking modes having high, medium and low heater heating calories, respectively;
   main control means for fetching preset mode data responsive to said mode set by said rice cooking mode setting means, and for supplying a predetermined energize/deenergize control signal corresponding to the preset mode data, to said heater;

power failure detecting means for detecting a temporary interruption of a drive power voltage to said to said main control means after the preset mode data has been fetched in said main control means, and for maintaining the detected state for a predetermined period of time;

power interrupt recovery operation control means for fetching a detection signal from said power failure detecting means when supply of the drive voltage to said main control means is recovered, and for controlling said main control means to supply an energize/deenergize control signal corresponding to a specific rice cooking mode of a medium heating calorie to said heater;

preset mode display means including at least three display elements which correspond to the preset mode data; and mode display control means for controlling all the display elements of said preset mode display means by fetching the detection signal from said power failure detecting means when supply of the drive voltage to said main control means is recovered.

2. A circuit according to claim 1, wherein said circuit further comprises preset mode display means which has at least three display elements which are flashed so as to correspond to the preset mode data, and mode display control means for controlling all the display elements of said preset mode display means by fetching the detection signal from said power interrupt detecting means when supply of the drive voltage to said main control means is recovered.

3. A circuit according to claim 1, wherein the rice cooking modes include at least three modes from the group including a polished rice cooking mode, an unpolished rice cooking mode, a rice with other ingredients mode, a rice with red beans cooking mode, and a rice gruel cooking mode, and wherein said specific mode at the medium heating calorie is the unpolished rice cooking mode.

4. A circuit according to claim 1, wherein said power interrupt detecting means includes capacitor means for charging only when energization by said main control means is initiated, and for discharging only when energization ends, and comparator means for comparing a terminal voltage of said capacitor means with the drive power voltage supplied to said main control means, and for supplying a comparison output to said main control means.

5. A circuit according to claim 1, wherein said power interrupt recovery operation control means includes initialization means for initializing said drive source voltage, and for supplying the initialized voltage to said main control means.

6. A circuit according to claim 1, wherein said mode control operation display means has at least a four-digit display, and is for sequentially displaying a soak operation, a rice cooking operation, a steam operation and a keeping warm operation based on a control operation of said main control means;

and said mode control operation display control means is also for controlling all the digits of the display of said mode control operation display means by fetching the detection signal from said power failure detecting means when a supply of the drive voltage to said main control means is recovered.

7. A circuit according to claim 6, wherein said mode control operation display means is a display unit for displaying a standby time in a timer operation.

* * * * *